(12) United States Patent
Ditter

(10) Patent No.: US 9,079,684 B2
(45) Date of Patent: *Jul. 14, 2015

(54) COLLAPSIBLE CHEESE CONTAINER

(75) Inventor: Jeffrey D. Ditter, Austin, TX (US)

(73) Assignee: Buckhorn, Inc., Milford, OH (US)

( * ) Notice: Subject to any disclaimer, the term of this patent is extended or adjusted under 35 U.S.C. 154(b) by 1130 days.

This patent is subject to a terminal disclaimer.

(21) Appl. No.: 12/795,339

(22) Filed: Jun. 7, 2010

(65) Prior Publication Data

US 2010/0239730 A1    Sep. 23, 2010

Related U.S. Application Data

(63) Continuation of application No. 11/415,677, filed on May 2, 2006, now Pat. No. 7,757,876.

(60) Provisional application No. 60/677,171, filed on May 3, 2005.

(51) Int. Cl.
*B29C 33/20* (2006.01)
*B65D 19/18* (2006.01)
(Continued)

(52) U.S. Cl.
CPC .............. *B65D 19/18* (2013.01); *A01J 25/15* (2013.01); *B65D 25/101* (2013.01); *B65D 85/76* (2013.01); *B65D 2519/008* (2013.01); *B65D 2519/00034* (2013.01); *B65D 2519/00069* (2013.01); *B65D 2519/0081* (2013.01); *B65D 2519/00174* (2013.01); *B65D 2519/00208* (2013.01); *B65D 2519/00268* (2013.01); *B65D 2519/00288* (2013.01); *B65D 2519/00318* (2013.01); *B65D 2519/00338* (2013.01); *B65D 2519/00407* (2013.01); *B65D 2519/00422* (2013.01); *B65D 2519/00427* (2013.01);
(Continued)

(58) Field of Classification Search
CPC ..................... B29C 33/0088; B65D 2519/008; B65D 2519/0034; B65D 2519/0069; B65D 2519/00641; B65D 2519/00647
USPC .................. 425/406, 441–443, 450.1, 451.9; 249/117, 121, 167; 99/460; 426/389, 426/397, 478, 512, 518, 582; 220/212, 220/4.31, 4.28, 676
See application file for complete search history.

(56) References Cited

U.S. PATENT DOCUMENTS 886,530 A    5/1908  Mestemacher
3,374,915 A   3/1968  Verhein et al.
(Continued)

FOREIGN PATENT DOCUMENTS

EP    2149295 A1    2/2010

OTHER PUBLICATIONS

"Joseph Heler say Cheese with LINPAC Allibert," CustomerFocus, Storage and Handling Solutions from LINPAC Allibert, LINPAC Allibert Limited, Bromsgrove, UK, Jan. 2008, 2 pgs.
(Continued)

*Primary Examiner* — Joseph S Del Sole
*Assistant Examiner* — Thukhanh T Nguyen
(74) *Attorney, Agent, or Firm* — Benesch, Friedlander, Coplan & Aronoff, LLP

(57) ABSTRACT

Embodiments described herein provide a system for molding cheese having a pressboard for compressing cheese in a cheese mold. The pressboard includes spring alignment features to align a set of leaf springs that help ensure even compression of the cheese.

9 Claims, 9 Drawing Sheets

(51) Int. Cl.
*A01J 25/15* (2006.01)
*B65D 25/10* (2006.01)
*B65D 85/76* (2006.01)

(52) U.S. Cl.
CPC ............... *B65D 2519/00497* (2013.01); *B65D 2519/00587* (2013.01); *B65D 2519/00641* (2013.01); *B65D 2519/00711* (2013.01); *B65D 2519/00975* (2013.01)

(56) References Cited

U.S. PATENT DOCUMENTS

| | | | |
|---|---|---|---|
| 3,401,814 A | 9/1968 | Chiswell et al. | |
| 3,679,034 A | 10/1972 | Shell | |
| 4,000,827 A | 1/1977 | Emery | |
| 4,083,464 A | 4/1978 | Burnett | |
| 4,300,695 A | 11/1981 | Hsu | |
| 4,402,397 A | 9/1983 | Spence | |
| 4,456,142 A | 6/1984 | Burling | |
| 4,461,395 A | 7/1984 | Burnett | |
| 4,591,065 A | 5/1986 | Foy | |
| 4,735,330 A | 4/1988 | Hoss | |
| 4,735,331 A | 4/1988 | Keenan et al. | |
| 4,775,068 A | 10/1988 | Reiland et al. | |
| 4,782,972 A | 11/1988 | Wenkman et al. | |
| 4,809,851 A | 3/1989 | Oestreich, Jr. et al. | |
| 4,917,255 A | 4/1990 | Foy et al. | |
| 4,960,223 A | 10/1990 | Chiang et al. | |
| 4,969,567 A | 11/1990 | Rogers | |
| 5,024,146 A | 6/1991 | Dull | |
| 5,076,454 A | 12/1991 | Garton et al. | |
| 5,287,981 A | 2/1994 | Wheeler | |
| 5,508,746 A | 4/1996 | Lim | |
| 5,711,444 A | 1/1998 | Meacham et al. | |
| 5,921,171 A * | 7/1999 | Dreano | 249/167 |
| 7,757,876 B1 | 7/2010 | Ditter | |

OTHER PUBLICATIONS

Office Action issued in U.S. Appl. No. 11/415,677, mailed Jul. 24, 2009, 8 pgs.

* cited by examiner

COLLAPSIBLE CHEESE CONTAINER

RELATED APPLICATIONS

This application is a continuation of, and claims a benefit of priority under 35 U.S.C. 120 of the filing date of U.S. patent application Ser. No. 11/415,677 by inventor Jeffrey D. Ditter entitled "Collapsible Cheese Container" filed on May 2, 2006, now U.S. Pat. No. 7,757,876 which claims the benefit of priority under 35 USC §119(e) to U.S. Provisional Patent Application No. 60/677,171, entitled "Plastic Cheese Form and Transport Box," by Ditter, filed May 3, 2005, each of which is hereby fully incorporated by reference herein.

TECHNICAL FIELD OF THE INVENTION

The present invention relates to collapsible containers. More particularly, embodiments of the present invention relate to collapsible and reusable container used for bulk cheese transport.

BACKGROUND OF THE INVENTION

Currently, cheese manufactures use plywood, metal and a small number of plastic re-usable containers to ship cheese. Each of these containers suffers a variety of shortcomings, as described below.

The predominant container in the industry for shipping bulk cheese is a plywood box with metal frame components. Typically, a set of plywood walls, including top and bottom sections, are connected together to form a square or rectangular box. Because the cheese can assert significant pressure on the walls, metal bands on the outside of the walls are used to prevent or reduce bowing of the walls. Because this container is made of wood, which is porous, and steel, which can rust, the surfaces must be resealed for hygienic reasons. This is done by coating the wood components with wax and stripping the paint from the metal components and repainting. When the cheese reaches its destination, the cheese box is broken down and shipped back to the cheese manufacturer for reuse. However, the wax must be stripped and re-applied before the returnable container is reused. This is a time intensive process that is often performed at third party facilities. Additionally, popular versions of this wood/metal container weigh approximately 118 lbs. and are difficult to assemble. The weight of the container does not allow a full truckload of cheese to be shipped because gross trailer weights are exceeded prior to the truck being full.

Metal containers made from stainless steel are sometimes used in the industry, but are restricted to in-plant use. This usage limitation is because the container is extremely expensive, heavy, dents easily and does not collapse for return shipment to point of origin.

Plastic containers manufactured using the low pressure structural foam process and molded from polycarbonate material represent approximately 1% of the market (circa 2005). One example of such as container is described in U.S. Pat. No. 5,287,981 to Wheeler. The known issues with commercial implementations of this cheese box are: (i) liquid whey gets trapped in the ribs of the lid and sidewalls; (ii) the container is susceptible to stress cracking because of the foam molding process; (iii) the finished surface of a structural foam part is not easily cleaned because it is not sufficiently smooth; and (iv) a 4 ft. long pry bar is typically required to open the container to access the cheese or a capital intensive automated opener can be used, requiring utilizing a fork truck to put the container in the device. As a subsidiary problem, if stress cracks do form in the plastic when cheese is in the box, cheese can enter the cracks. When the cheese is removed from the box, the cracks can reseal, trapping some residual amount of cheese. The cheese trapped in the sealed cracks can be difficult to remove, making reuse of the cheese box unhygienic. Furthermore, the use of a large pry bar to open the containers often causes damage to the containers.

As another deficiency of existing containers is that they make use of 6 to 8 steel coil springs that keep the cheese compressed during storage and transport. The springs are difficult to separate from one another when shipped back to point of origin and re-coated with wax.

SUMMARY OF THE INVENTION

Embodiments of the present invention provide collapsible cheese mold that eliminates or reduces the shortcomings of prior collapsible cheese molds. One embodiment of the present invention includes a container for transporting cheese, comprising a base and four wall panels mounted on the base, each side wall comprising an inner surface, an outer surface and two end faces. A first two of the wall panels comprise a set of hooks protruding from the end faces and a second two of the wall panels comprise hook receivers. Each hook receiver defines an opening through a corresponding wall panel inner surface and comprises a receiver rib spanning the width of the opening. A receiver rib has an outer face to engage an inner face of the respective hook. Each opening and receiver rib is sized to allow a portion of the respective hook to pass over the receiver rib. The sidewalls interlock using manual force and no tools.

Another embodiment of the present invention comprises a container for transporting cheese substantially formed from molded plastic. The container comprises a base having at least one upwardly extending base rib, four wall panels mounted on the base and aligned by the at least one upwardly extending base rib, each side wall comprising an inner surface, a ribbed outer surface and two end faces, a lid having an outer lip and defining a cavity, wherein the outer lip of the lid fits on the outside of the four wall panels when the lid is in place, a plurality of leaf springs contacting an underside of the lid and a pressboard having a top surface contacting the plurality of leaf springs. The first two of the wall panels comprise a set of hooks protruding from the end faces and a second two of the wall panels comprise hook receivers. Each hook receiver defines an opening through a corresponding wall panel inner surface and comprises a receiver rib spanning the width of the opening. Each receiver rib has an outer face to engage an inner face of the respective hook. Each receiver is sized to allow at least a portion of the respective hook to pass over the receiver rib.

Embodiments of the present invention provide an advantage by providing a collapsible container that can be easily broken down with a hand tool without damaging the container.

Embodiments of the present invention provide another advantage reducing the weight of the cheese mold, allowing more molds to be transported per shipment.

Embodiments of the present invention provide yet another advantage by providing a spring design that does not require detangling.

BRIEF DESCRIPTION OF THE FIGURES

A more complete understanding of the present invention and the advantages thereof may be acquired by referring to the following description, taken in conjunction with the accompanying drawings in which like reference numbers indicate like features and wherein.

DETAILED DESCRIPTION

Preferred embodiments of the invention are illustrated in the FIGURES, like numerals being used to refer to like and corresponding parts of the various drawings.

Embodiments of the present invention provide a re-usable, collapsible, plastic container for the bulk cheese industry with improved ergonomics and cheese processing and shipping features. Various embodiments of the present invention provide advantages over prior art cheese container systems and methods by eliminating six coif springs that require detangling with each use, improving ergonomics by reducing the weight of the container, reducing transportation costs by allowing at least an additional two blocks of cheese per truckload, providing components designed to stack and nest thereby reducing transportation costs further by allowing 510 empty plastic containers to be returned per truck instead of 360 containers with the existing wood/metal system; using a non-porous smooth surface eliminates the need to require third party wax removal and reapplication every use; using materials with reduced insulation properties designed to cut the cool down refrigeration time for the cheese in half; reducing the number of container parts; and reducing the cost to manufacture compared to current market containers.

Figure 1:
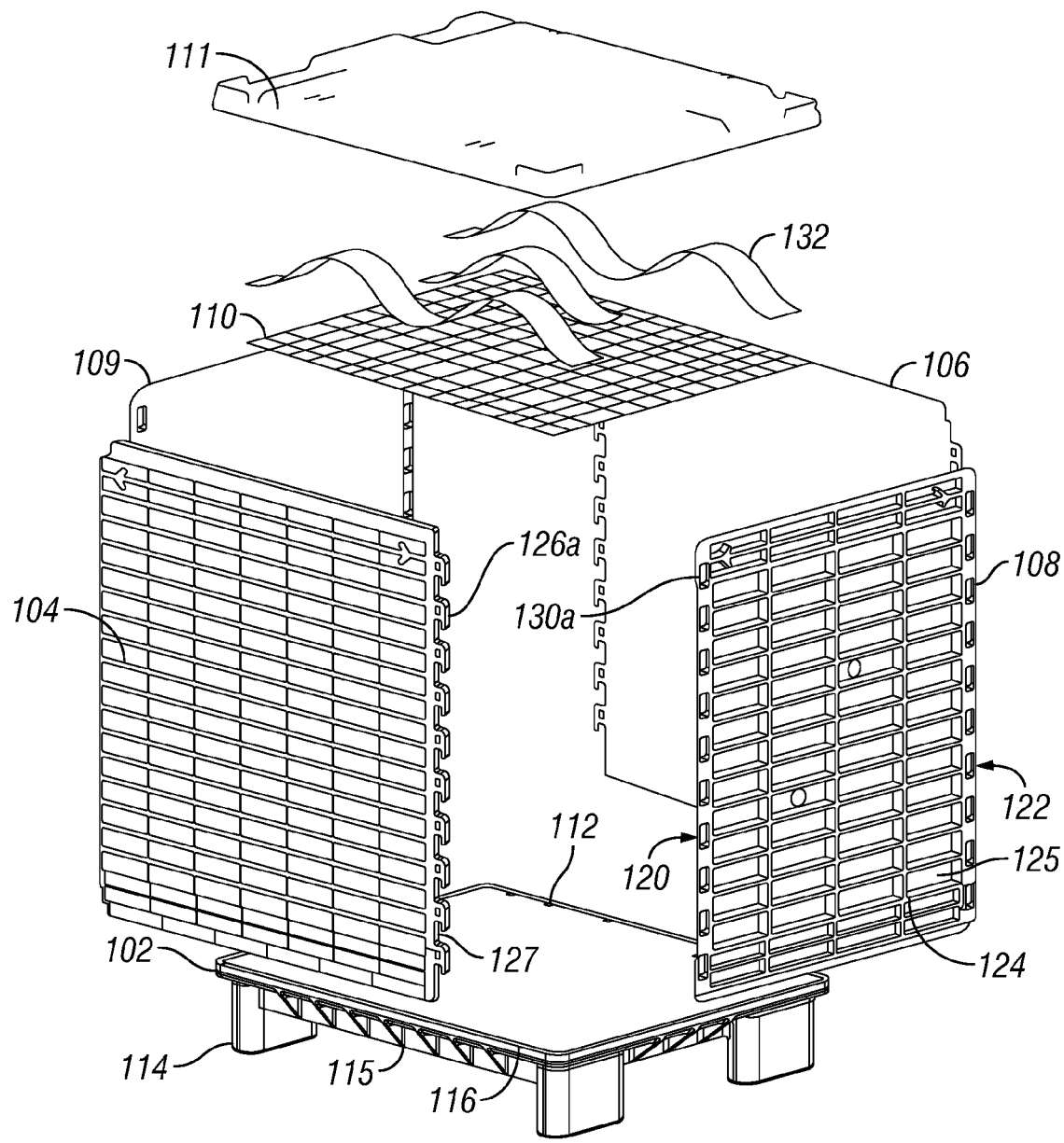
FIG. 1 is a diagrammatic representation of one embodiment of a collapsible cheese mold.

FIG. 1 is a diagrammatic representation of an isometric exploded view of one embodiment of a cheese box 100. Cheese box 100, according to one embodiment, includes a base 102 that acts as the bottom of a cheese mold, four wall panels (e.g., wall panel 104, wall panel 106, wall panel 108 and wall panel 109) and a pressboard 110 and a lid 111. Base 102, wall panels 104, 106, 108 and 109, pressboard 110 and lid 111 can each be a single piece of molded plastic such as filled polypropylene (e.g., polypropylene filled with calcium carbonate for rigidity), polyethylene, polypropylene or other plastic known in the art formed using low pressure gas assist injection molding or other plastic forming techniques. Preferably, the plastic is safe for use in the food industries. The base 102, four wall panels 104, 106, 108 and 109 and pressboard 110 can act as a cheese mold to shape a block of cheese. Cheese box 100, according to one embodiment, can be a rectangular box such that there are long wall panels 104 and panels 106 and short wall panels 108 and 109, though other embodiments can have other shapes.

Figure 5:
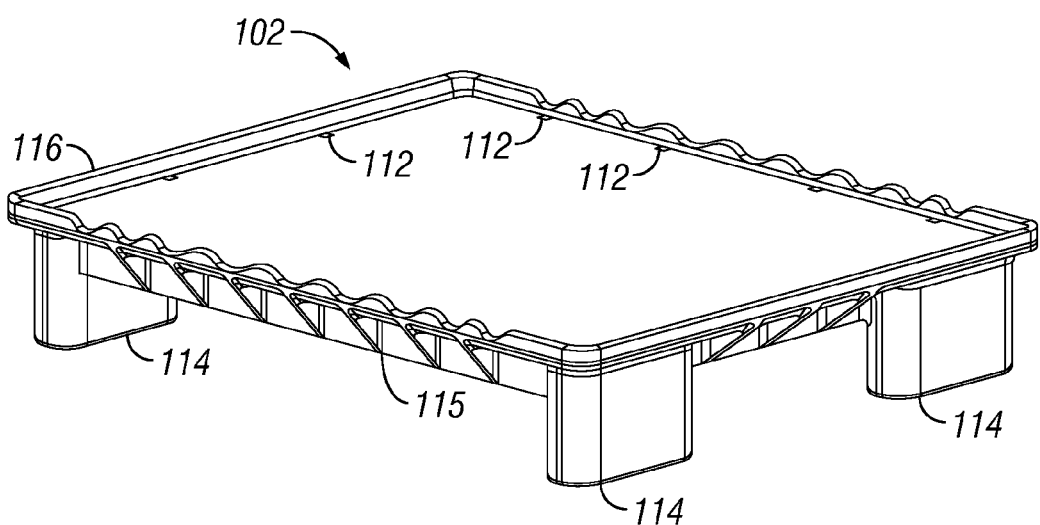
FIG. 5 is a diagrammatic representation of one embodiment of a base of a collapsible mold.

Base 102 can be a single piece of molded plastic and can include drain holes 112 to allow drainage from cheese box 100 (additional drain holes are shown in FIG. 5). Base legs 114 can support cheese box 100. Base legs 114 can be spaced such that a fork lift can place its fork under cheese box 100 from the sides or at an angle (e.g., with the fork straddling one of the base legs 114 from the corner). For example, base legs 114 can be spaced to allow a fork lift to lift cheese box 100 from the long side (e.g., with fork lift facing long wall 104) as well as on a 45° angle from the long side and short side (e.g., with the fork lift facing the corner between long wall 104 and short wall panel 108). A set of base ribs 115 on the bottom surface of base 102 to prevent or reduce deflection in base 102. Base ribs 115 can run the length of the underside of base 102 to form a grid-like pattern on the underside of base 102. A lip 116 extending from base 102 aids in aligning the wall sections near the periphery of base 102. Lip 116 can be a portion of a continuous lip or a one of several disjoint lips.

Each wall section can include a relatively smooth inner side and ribbed outer side. In the example of FIG. 1, wall section panel 108 includes inner side 120 and outer side 122 with ribs 124. In this embodiment, the ribs include spaced horizontal and vertical ribs to form a grid pattern on outer side 122. The ribs can be spaced so that the pockets formed by the ribs (e.g., area 125) are at least three times as long as they are deep. This allows for easy cleaning in a washing machine.

Figure 2:
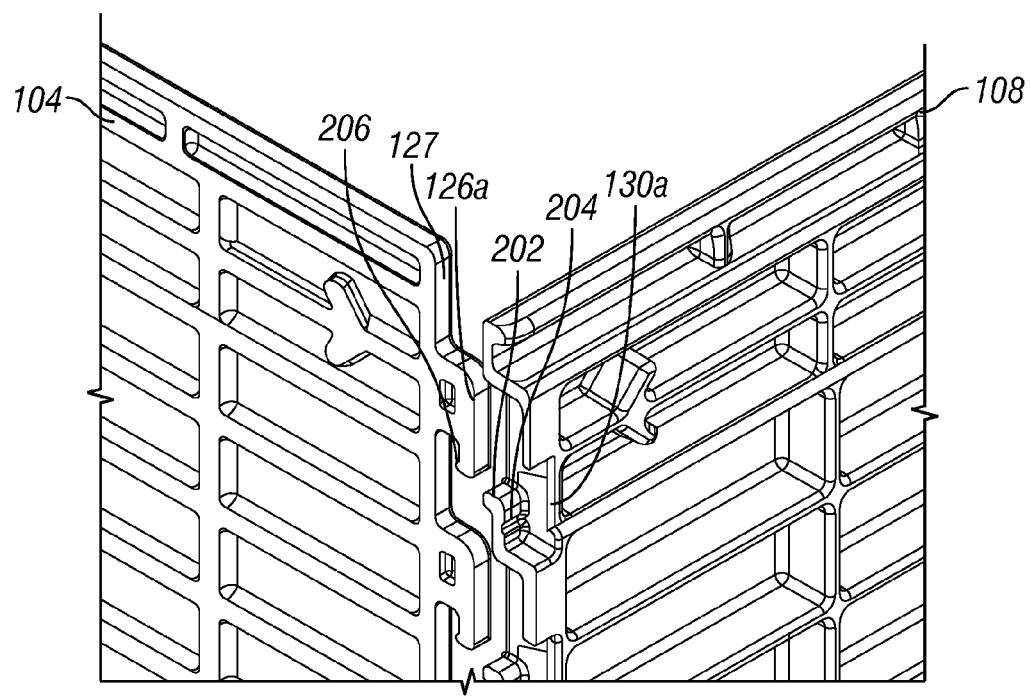
FIG. 2 is a diagrammatic representation of one embodiment of a latching mechanism for a cheese mold.
Figure 3:
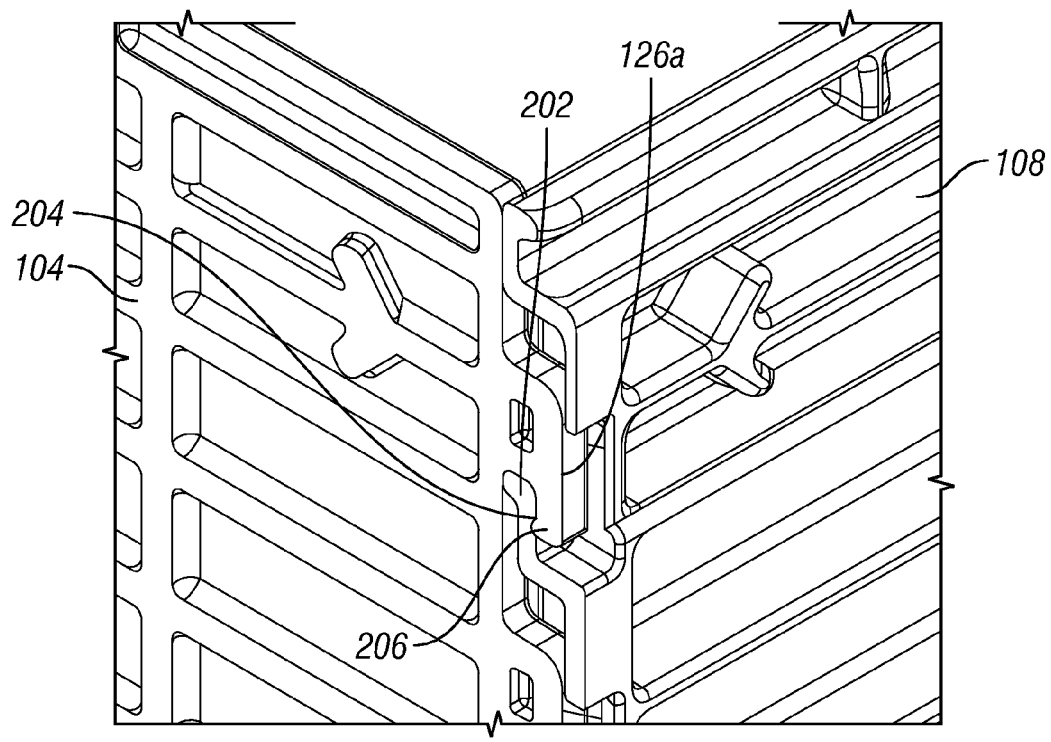
FIG. 3 is a diagrammatic representation of another view of the embodiment of the latching mechanism for the cheese mold.

According to one embodiment, the wall sections are joined together using a hook and receiver, discussed in conjunction with FIGS. 2-3. In the example of FIG. 1, long wall panel 104 includes a set of hooks protruding from its end faces, such as hook 126a extending from end face 127. Short wall panel 108 includes complementary hook receivers, such as hook receiver 130a to receive hook 126a. Each hook receiver can include an opening through the inner side of the wall panel through which a hook can pass over hook can pass. The hook hooks on a receiver rib on the bottom of and running the width of the opening. By way of example, hook 126a can be pass through the opening of the corresponding receiver 130a and lower so that the portion of the hook 126a facing the end face 127 of long wall panel 104 (i.e., an inner surface of hook 126a) hooks to the outer surface side of the receiver rib of receiver 130a.

Pressboard 110 can be a free floating section with a smooth inner surface and ribbed outer surface. Lid 111 can be placed over pressboard 110 and can mate with wall panel 104, panel 106, panel 108 and panel 109. Leaf springs 132 between lid 111 and pressboard 110 press pressboard 110 down against the cheese when cheese is in box 100. Leaf springs 132, according to one embodiment, are made of stainless steel to allow ease of cleaning and many years of use. They are configured to provide pressure fully compressed flat or with only 0.5" of deflection. Leaf springs 132, like the rest of box 100, do not require stripping and recoating of wax each trip. The leaf springs 132 also stack nested for ease of handling and compact return shipment.

The outer surface of pressboard 110 can have alignment features to aid in placing the leaf springs 132 when cheese box 100 is assembled. Lid 111 can include alignment features defined in the outer surface of lid 111 that receive the legs of another cheese box. This allows cheese boxes to be easily stacked for shipping and storage.

In operation, the side walls can be coupled together using the hooks and respective receivers. For example, hook 126a of long wall panel 104 can be inserted into receiver 130a of short wall panel 108 so that hook 126a passes over the receiver rib of receiver 130a. Long wall panel 104 can be pressed down so that the 126a engage with the back or outer side of the receiver rib. Protrusions on the hook and detents on the receiver rib can aid in preventing vertical movement of the sidewalls relative to each other.

In one embodiment, the assembled wall panels can be placed upside-down (e.g., on a dolly). By way of example, but not limitation, up to 700 lbs. of compacted curd is placed in the cavity formed by the sidewalls which are resting upside down. The cheese is then pressed. The sidewall design with a smooth inner surface allows the liquid whey to drain off and be reclaimed. Base 102 is placed on the sidewalls. In this configuration, the cheese container is upside down. The loaded assembly is then inverted so the base is on the bottom (i.e., the cheese container is inverted so that base 102 is on the bottom). Pressboard 110 is then placed inside the side walls on top of the cheese. Pressboard 110 has molded in alignment features that allow placement of the leaf springs 132 that are placed on pressboard 110. Lid 111 is placed on top of leaf springs 132 to compress the leaf springs 132. Lid 111 is forced down to compress the leaf springs 132 and secured with banding.

The cheese will continue to drain whey and holes in the sidewalls and base are designed to allow the whey to run off for reclamation. The cheese can be refrigerated and shipped in the container to a cheese processor. Box 100 is opened by cutting the band/straps, removing the lid 111, springs 132 and pressboard 110. To disassemble the remainder of box 100, a small prying device, such as screwdriver, can be placed under the end of one of the hooks and the hook forced upward. This will cause the wall panel to which the hooks are attached (e.g., long wall panel 104) to move up relative the wall panel including the hook receiver (e.g., short wall panel 108) (illustrated in FIG. 4). When the hooks have been disengaged from the receiver ribs, the wall panels can be separated. Lids, pressboards and wall panels from multiple cheese containers can then be stacked. The bases for the multiple cheese containers can also be stacked. According to one embodiment, the bases are stacked by crisscrossing the bases. In other words, when a base is stacked on top of another base, the upper base is aligned such that the long axis of the upper base is perpendicular to the long axis of the lower base. The container can be returned to the cheese manufacturer in its broken down form.

FIG. 2 is a diagrammatic representation of one embodiment of a hook 126a protruding from end wall 127 of wall panel 104 and a hook receiver 130a defined in wall panel 108. It should be noted that the end face of wall panel 108 has been removed to provide a profile of the hook receiver 130a. Receiver 130a includes an opening through inner surface of wall panel 108 through which hook 126a passes. Receiver 130a also includes a receiver rib 202 that includes a detent 204 on its outer side. Receiver rib 202 can span the entire width of the opening of hook receiver 130a. Hook 126a includes a protrusion 206 on an inner surface.

FIG. 3 is a diagrammatic representation of hook 126 in place in hook receiver 130a. Initially, hook 126 passes through the opening in the inner side surface of wall panel 108 and over hooking tab 202. When wall panel 104 is moved down, hook 126a hooks on the back of receiver rib 202 and protrusion 206 is captured by detent 204. Hook 126a can be resilient enough so that hook 126a moves to a position in which protrusion 206 rests in detent 204. Relative horizontal movement of wall panel 104 and wall panel 108 is prevented by the contact of the hook with the outer side face of hooking tab 202. Relative vertical movement is impeded by detent 204 and protrusion 206.

It should be noted that other embodiments of a hook and hook receiver can be utilized. For example, hook receiver 130a can include protrusions on receiver rib 202 and hook 126a can include an indent to receive the protrusion of hooking tab 204. As another example, other hooks and complimentary receiver ribs may not include a protrusion and detent. In other words, relative vertical movement of the wall panels may be impeded at a subset of the hooks and hook receivers while friction impedes vertical movement at other hooks and hook receivers.

The four side panels act as an independent form in the cheese process. They are held together, according to one embodiment, without moving parts or hardware (or with minimally moving parts) using a hook and receiver type edge joint. The hooks on the long wall panel and the receiver ribs on the short allow for locking and unlocking in a vertical motion, while the container remains substantially rigid and square in the horizontal directions. The hooks and respective receivers can be configured to equal strength in both the long and short wall panels by equalizing the amount of material commissioned at the joint.

Figure 4:
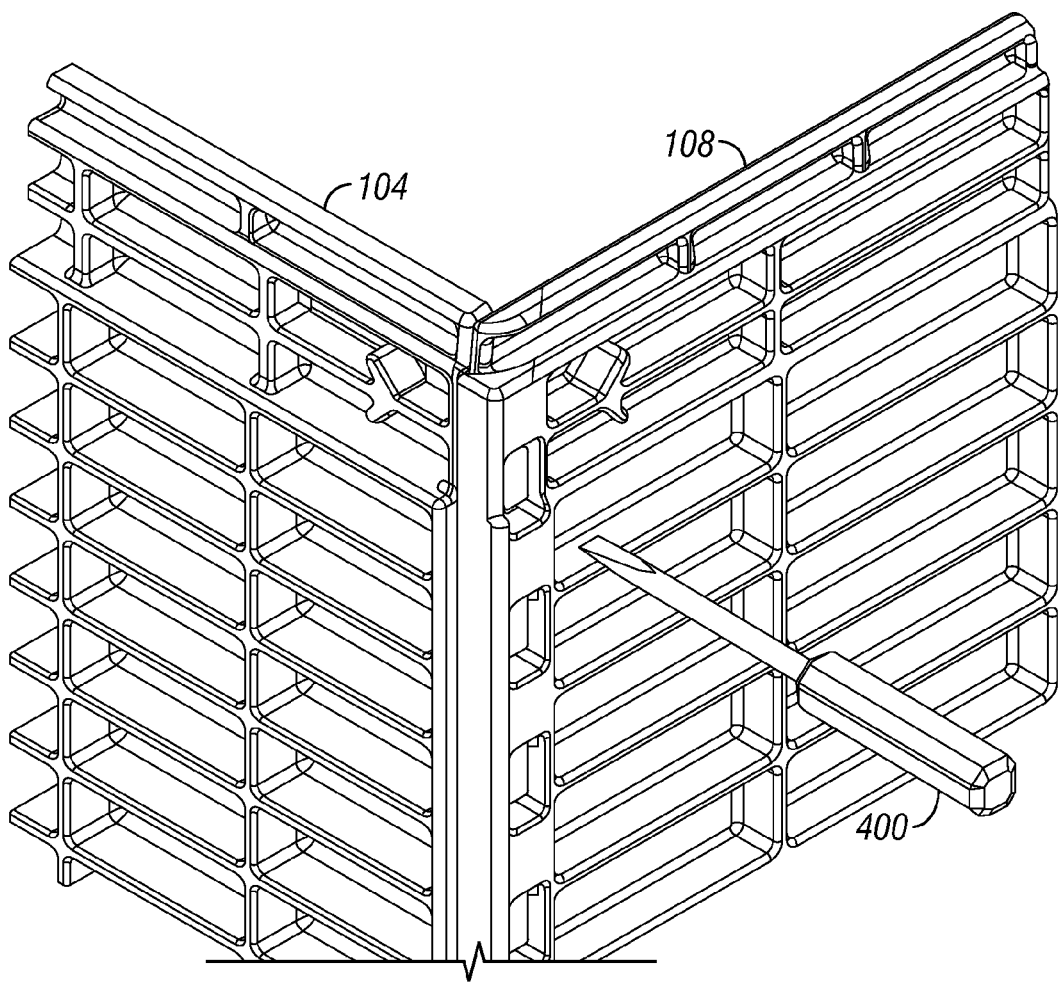
FIG. 4 is a diagrammatic representation of one embodiment of collapsing a cheese mold.

FIG. 4 is a diagrammatic representation of one embodiment of disassembling a box 100. In the embodiment of FIG. 4, a small prying device, such as a flat head screwdriver 400 is placed between the end of a hook (e.g., hook 126a) and the base of the complimentary hook receiver (e.g., hook receiver 130a). When the hook is pried up, long wall 104 moves up relative to short wall 108. Long wall 106 (shown in FIG. 1) can be pried similarly. When the hooks have disengaged from the respective receiver ribs, short wall 108 can be pulled away from the long walls.

FIG. 5 is a diagrammatic representation of one embodiment of a base 102. Base 102 can be a single piece of molded plastic and can include drain holes 112 to allow drainage from cheese box 100. Base legs 114 can support cheese box 100. Base legs 114 can be spaced such that a fork lift can place its fork under cheese box 100 from the sides or at an angle (e.g., with the fork straddling one of the base legs 114 from the corner). For example, base legs 114 can be spaced to allow a fork lift to lift cheese box 100 from the long side (e.g., with fork lift facing long wall 104) as well as on a 45° angle from the long side and short side (e.g., with the fork lift facing the corner between long wall 104 and short wall panel 108). A set of base ribs 115 on the bottom surface of base 102 to prevent or reduce deflection in base 102. Base ribs 115 can run the length of the underside of base 102 to form a grid-like pattern. Lip 116 extending upward at the edge of base 102 aids in aligning the wall sections near the periphery of base 102. Lip 116 can be a portion of a continuous lip or a one of several disjoint lips. As shown in the embodiment of FIG. 5, lip 116, in this embodiment is a continuous lip that is "wave" shaped for a portion of the long side of base 102.

Figure 6:
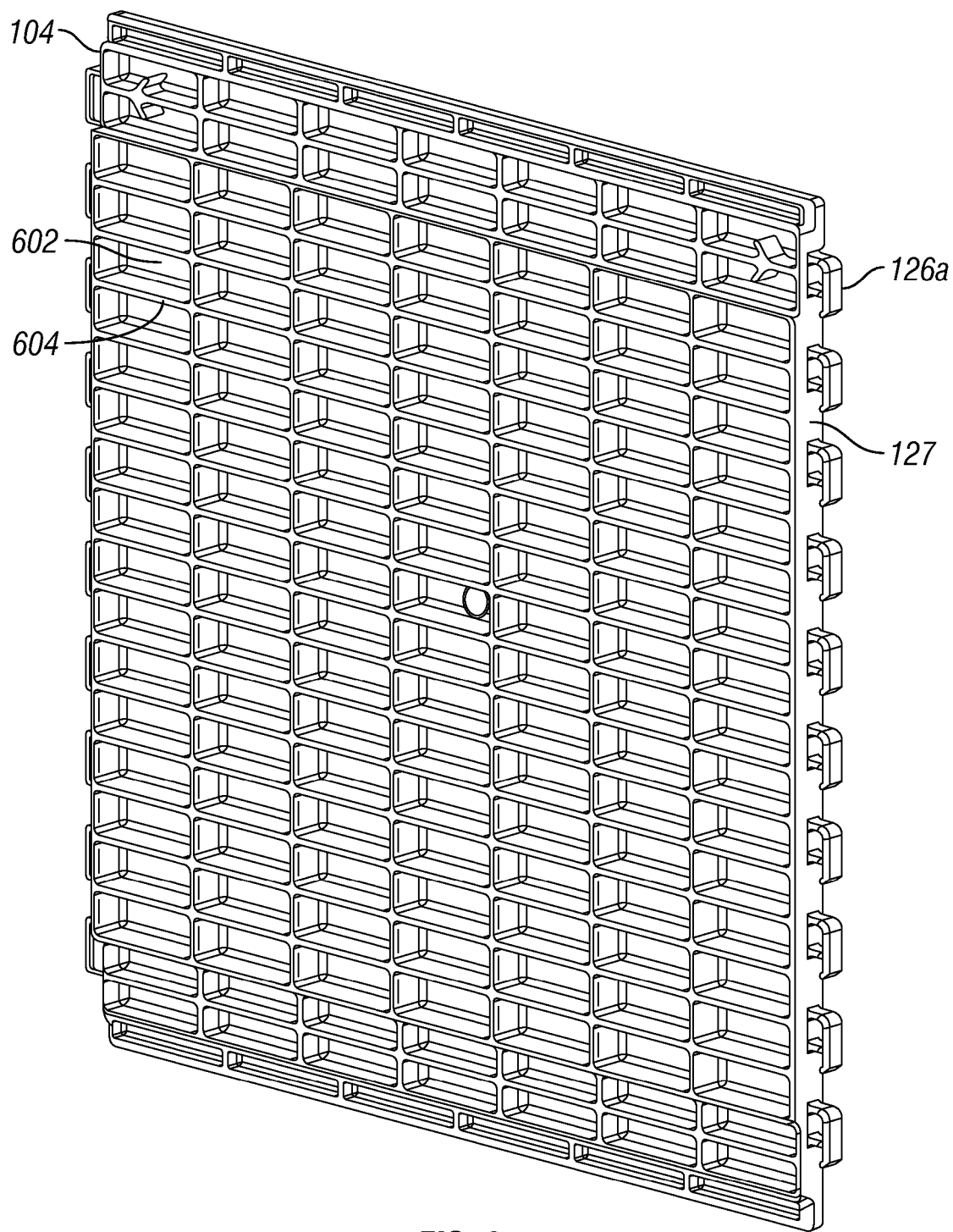
FIG. 6 is a diagrammatic representation of one embodiment of a wall panel of a collapsible cheese mold having hooks.

FIG. 6 is a diagrammatic representation of one embodiment of long wall panel 104. Long wall panel 104 can include a number of vertical and horizontal ribs (e.g., rib 602 and rib 604) laid out in a gird-like configuration. The ribs help minimize bulging of the container under stress. The inside surface of long wall panel 104 can be smooth to shape the cheese. Extending from each end surface of wall panel 104, in the embodiment of FIG. 6, is a column of molded hooks (e.g., hook 126a extending from end wall 127). The hooks, as discussed above, connect to a short side wall at respective hook receivers.

Figure 7:
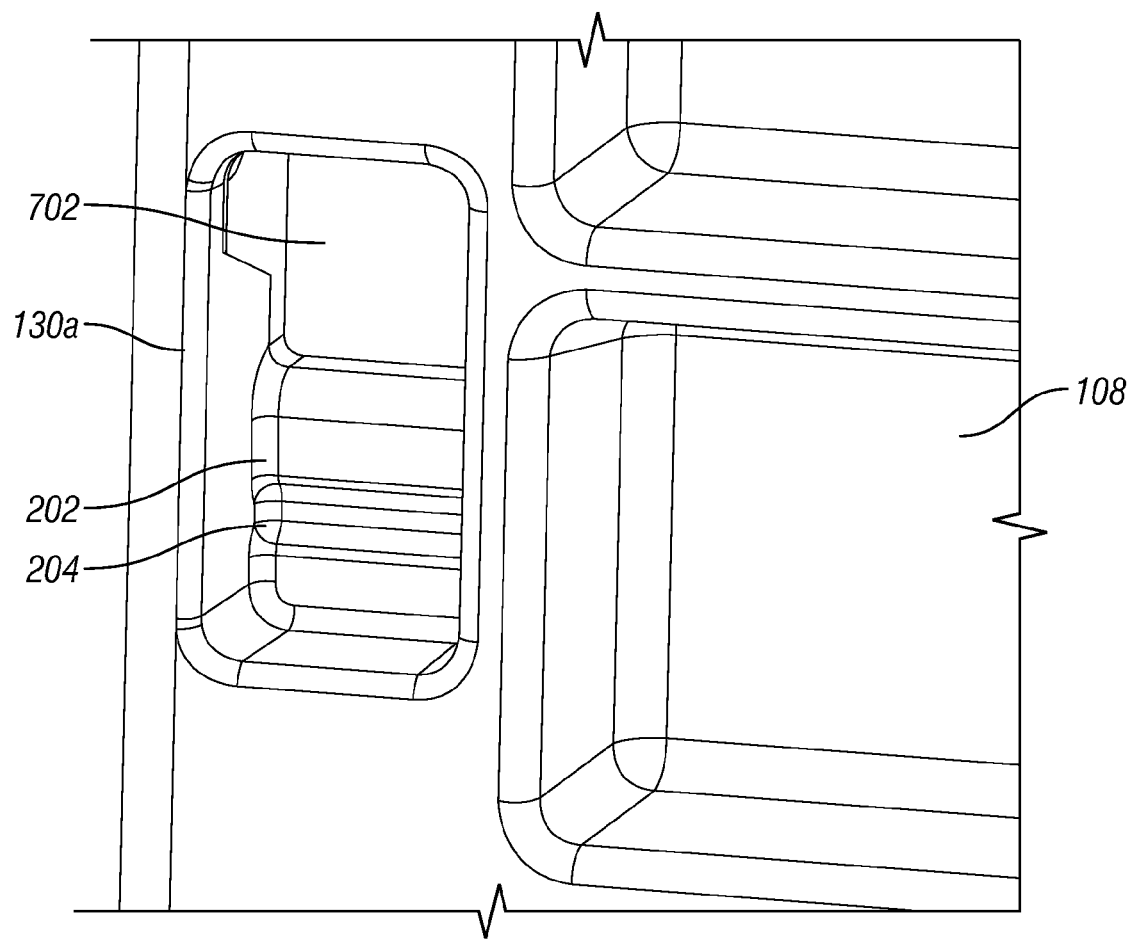
FIG. 7 is a diagrammatic representation of one embodiment of a wall panel of a collapsible cheese mold having hook receivers.

FIG. 7 is a diagrammatic representation of short side wall panel 108. Wall panel 108 can include a hook receiver (e.g., hook receiver 130a) to receive a hook. Hook receiver 130 includes an opening through the inner surface of wall panel 108 and, in the embodiment shown in FIG. 7, the outer surface of wall panel 108. Hook receiver 130a includes a receiver rib 202 that spans the base of receiver 130a. Receiver rib 202 can include a detent 206 to capture a protrusion on a respective hook to minimize relative vertical movement of wall panels. Hook receiver 130a can be sized such that a respective hook (e.g., hook 126a) can pass through area 702 hooking rib 202. When the hook moves downward, the hook will engage hooking rib 202.

Figure 8A:
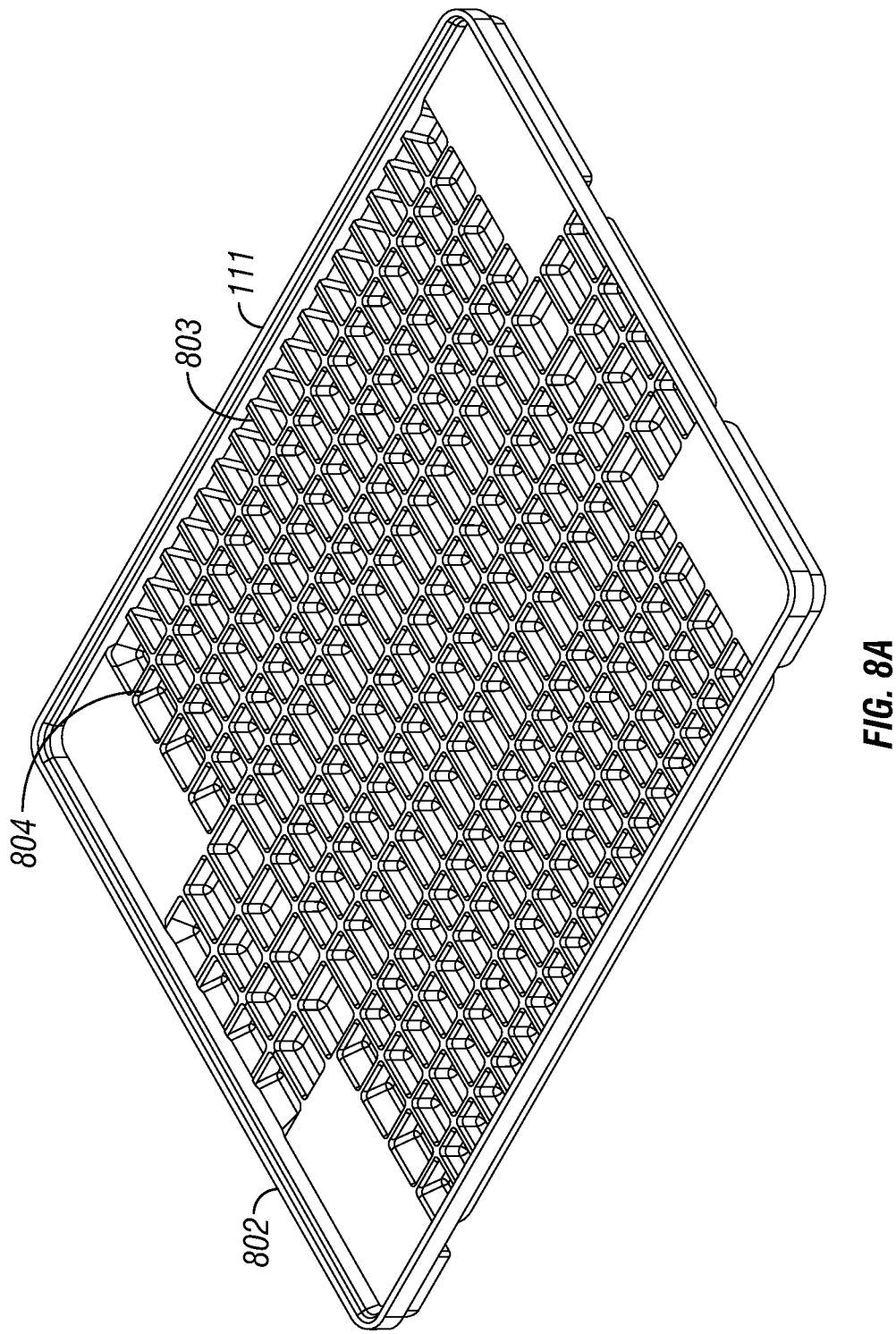
FIGS. 8a and 8b are diagrammatic representations of one embodiment of a lid for a cheese mold.

FIG. 8a is a diagrammatic representation of one embodiment of the top surface of the inner surface of lid 111. As can be seen in the embodiment of FIG. 8, the inner surface of lid 111 can define a cavity having lip 802 that fits on the outside of the wall panels when box 100 is assembled. Lip 802 around the perimeter of the lid 111 encloses the top edges of the wall panels so that the container forms a barrier around the cheese.

Inner surface 100 can further include a set of generally perpendicular ribs (e.g., rib 803 and 804) defined in at least a portion of the cavity of lid 111. The ribs are laid out, in the embodiment of FIG. 8a, to form a set of load cells on the inner surface of lid 111 to help prevent lid 111 from bulging under load. Thus, according to one embodiment, lid 111 is a one piece molded component with an internal rib structure to avoid bowing under stress.

Figure 8B:
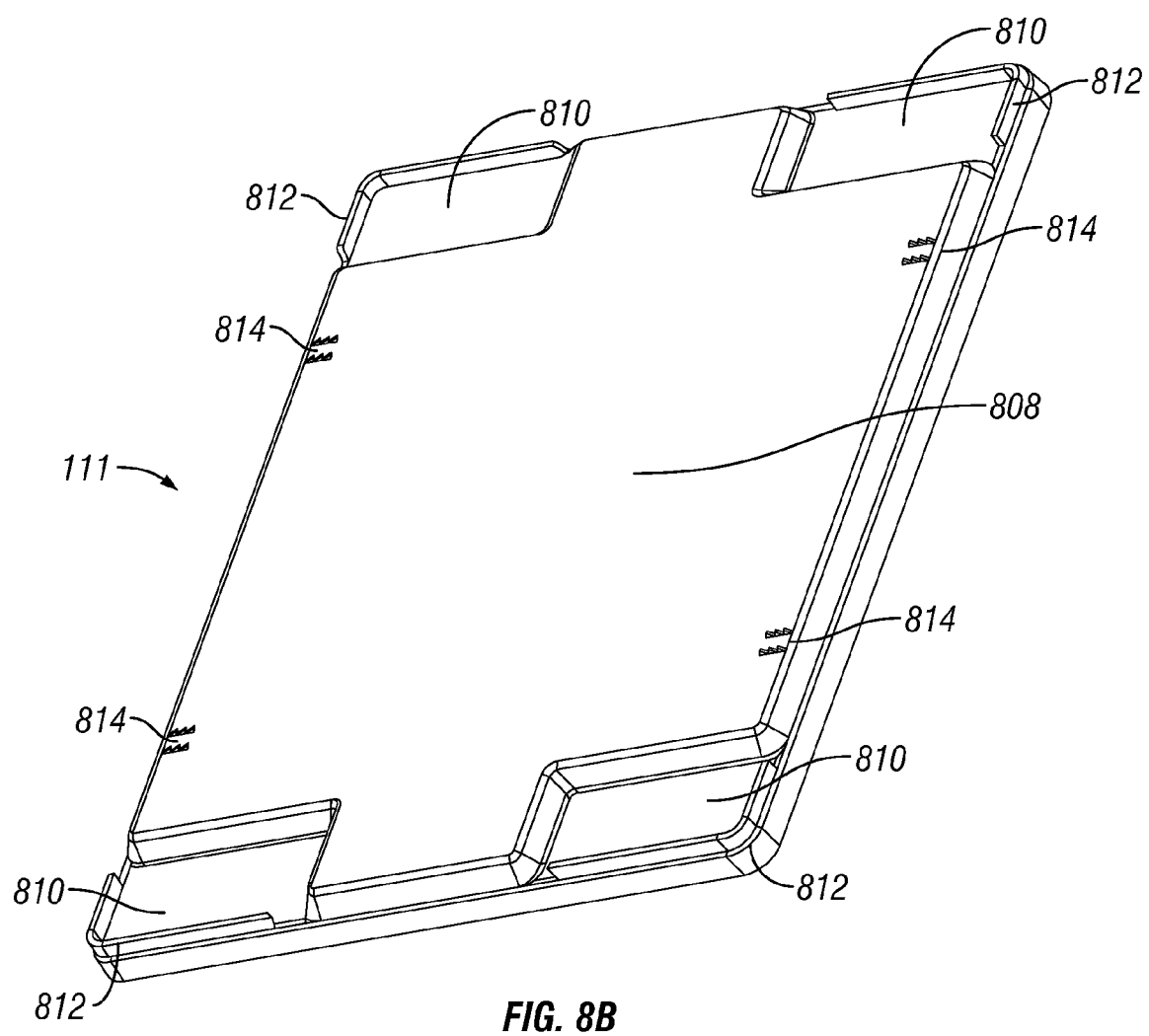

FIG. 8b is a diagrammatic representation of one embodiment of the top of lid 111. According to one embodiment, the top of lid 111 includes a raised surface 808 that is substantially smooth. At the four corners, lid 111 can include leg receivers to align legs of another cheese box so that the cheese boxes can be stacked. The leg receivers, according to the embodiment of FIG. 8b are formed by lower surfaces 810 sized to allow the leg of another cheese container to rest thereupon. Ribs (e.g., ribs 812) extending upwards from the edge of lid 111 prevent a stacked cheese container from sliding. According to one embodiment, up to four containers can be stacked on top of the bottom container for storage. Lid 111 can also include strap guides 814 to align banding straps.

Figure 9:
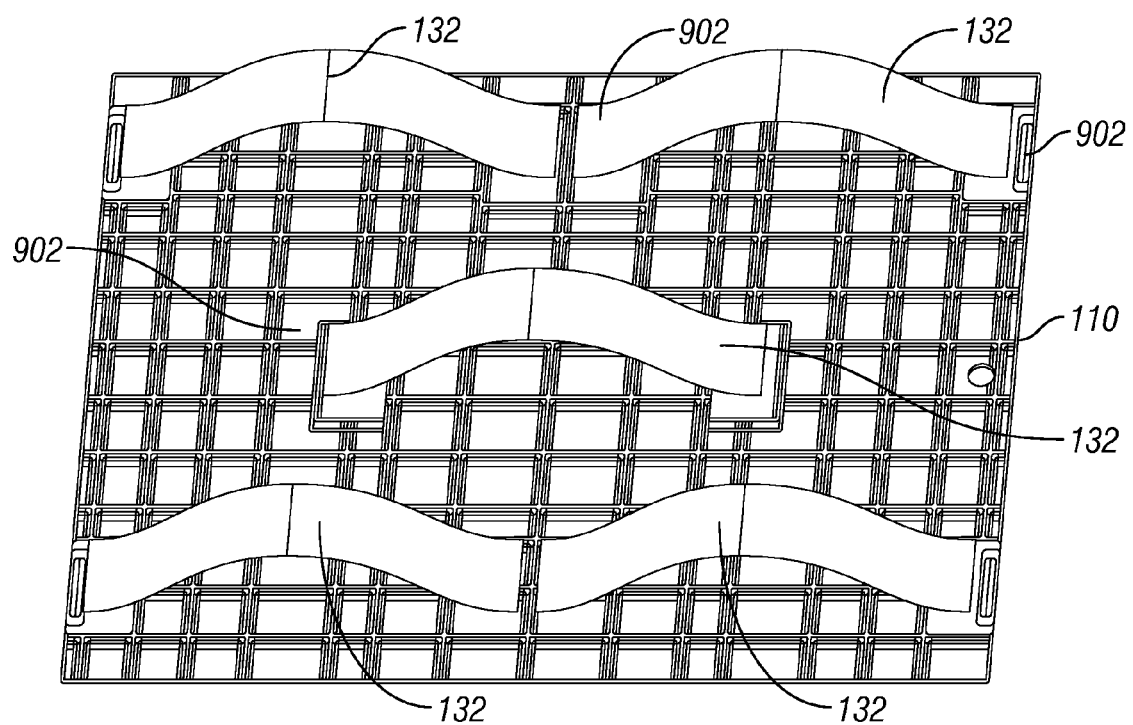
FIG. 9 is a diagrammatic representation of one embodiment of a pressboard for a cheese mold.

FIG. 9 is a diagrammatic representation of one embodiment of a pressboard 110. The inner surface of pressboard 110 can be smooth to mold the block of cheese, while the upper surface can be ribbed to prevent or reduce bowing. The upper surface of pressboard 110 can spring aligners (indicated, for example, at 902) to align leaf springs 132. These alignment features can include, for example, small lips or shelves under which the end of a leaf spring can fit. According to another embodiment, the spring aligners may simply be an area at which the ends of the leaf springs rest. In the Example of FIG. 9, leaf springs 132 are laid out such that one of leaf springs 132 straddles the center of pressboard 110, however other patterns can be used.

Figure 10:
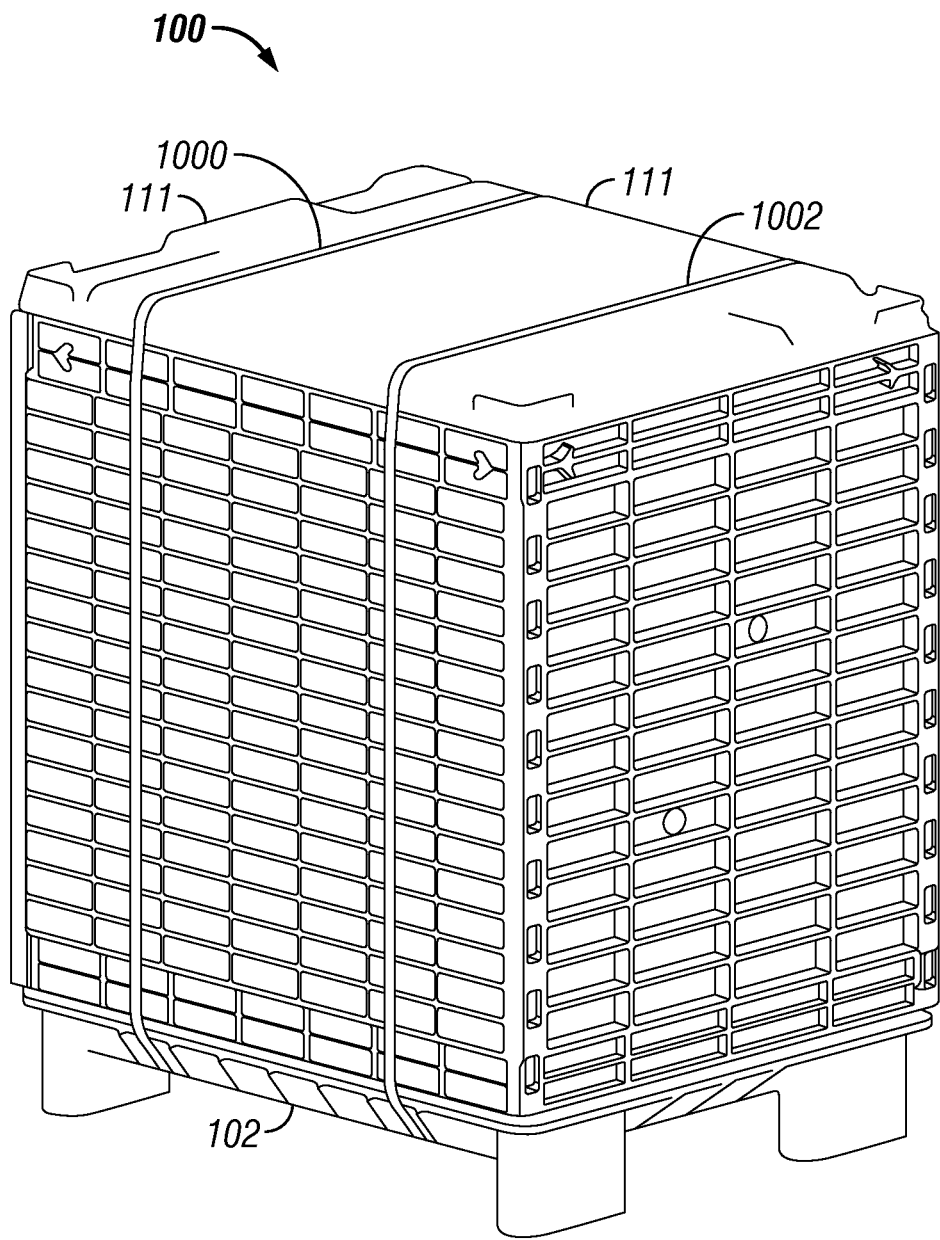
FIG. 10 is a diagrammatic representation of one embodiment of an assembled cheese mold.

FIG. 10 is a diagrammatic representation of one embodiment of an assembled cheese box 100 according to one embodiment of the present invention. As shown in the embodiment of FIG. 10, metal or plastic bands 1000 and 1002 can be used to band cheese box 100. The bands can run under base 102 and over lid 111. This holds lid 111 down against the leaf springs to Pressboard 110 down on the cheese during storage and shipment. By way of example, but not limitation, box 100 can be sized to hold a cheese block that is 28 inches wide, 22 inches deep and 28 inches high.

It should be noted that embodiments provided above are provided by way of example and the present invention can include other embodiments as would be understood by those in the art. For example, particular sidewalls can have hooks on one end and receivers on the other end, two of the sidewall can have a different length than the other two sidewalls (e.g., the container can be square or rectangular). Moreover, the receivers and hooks can have a variety of configurations that allow for connection between the various sidewalls.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed in the following claims.

What is claimed is:

1. A system for molding cheese comprising:
a pressboard for compressing cheese in a cheese holding area of a container, the pressboard comprising:
a smooth inner surface for contacting cheese;
an outer surface on the obverse side from the inner surface, the outer surface having spring alignment features disposed thereon, wherein the spring alignment features are molded within the outer surface of the pressboard and comprise lips adapted to capture end portions of leaf springs so that the end portions can move in the alignment features thereby allowing compression and expansion of the leaf springs while captured by the spring alignment features, and wherein the spring alignment features are positioned to align the leaf springs in desired positions;
a set of leaf springs detachably coupled to the pressboard, wherein each leaf spring is positioned so that the ends of each leaf spring are inserted in corresponding spring alignment features such that the lips fit over the ends of each leaf spring, and wherein each leaf spring has an undulating curvature so that the apex of the leaf spring will contact an inner surface of a lid of the container; and wherein each leaf spring, when detached from the pressboard, is capable of being nestably stacked on top of another leaf spring.

2. The container of claim 1, wherein the pressboard is a single piece of molded plastic.

3. The container of claim 1, wherein the set of leaf springs comprises a center leaf spring that crosses the center of the pressboard.

4. A container for storing and molding cheese comprising:
a base having an inner surface defining a bottom of a cheese holding area;
a set of sidewalls extending upwards from the base, the set of sidewalls having inner surfaces defining the sides of a cheese holding area;
a lid covering the cheese holding area, the lid in contact with the leaf springs so that the leaf springs apply pressure to the pressboard;
a pressboard comprising:
an inner surface defining the top of the cheese holding areas, the pressboard movable relative to the sidewalls;
an outer surface on the obverse side of the pressboard from the inner surface;
a set of spring alignment features molded within the outer surface of the pressboard and comprising lips adapted to capture end portions of leaf springs so that the end portions can move in the alignment features thereby allowing compression and expansion of the leaf springs while captured by the spring alignment features, and wherein the alignment features are positioned to align the leaf springs in desired positions;
a set of leaf springs detachably coupled to the pressboard, wherein each leaf spring is positioned so that the ends of each leaf spring are inserted in corresponding spring alignment features such that the lips fit over the ends of each leaf spring, and wherein each leaf spring has an undulating curvature so that the leaf spring contacts an inner surface of the lid, and wherein each leaf spring, when detached from the pressboard, is capable of being nestably stacked on top of another leaf spring.

5. The container of claim 4, wherein the pressboard is a single piece of molded plastic.

6. The container of claim 4, wherein the lid comprises a top face with corners, the top face having a smooth raised center portion comprising a majority of the top face and transitioning to a plurality of lower portions located proximate to the corners of the lid such that the center portion of the top face is raised compared the lower portions.

7. A method for molding and shipping cheese comprising:
providing a container for containing cheese in a cheese holding area;
placing a select amount of cheese in the cheese holding area;
providing a pressboard comprising a smooth inner surface for contacting cheese and an outer surface on an obverse side of the pressboard from an inner surface, the outer surface having spring alignment features disposed thereon, wherein the spring alignment features are molded within the outer surface of the pressboard and comprising lips adapted to capture end portions of leaf springs so that the end portions can move in the alignment features thereby allowing compression and expansion of the leaf springs while captured by the spring alignment features, and wherein the spring alignment features are positioned to align the leaf springs in desired positions;
aligning a set of leaf springs on the outer surface of the pressboard using the spring alignment features so that the ends of each leaf spring are inserted in a corresponding spring alignment feature such that the lips fit over the ends of each leaf spring, wherein the set of leaf springs is detachably coupled to the pressboard, and wherein each leaf spring has an undulating curvature, and wherein each leaf spring, when detached from the pressboard, is capable of being nestably stacked on top of another leaf spring;
positioning the pressboard so that an inner surface of the pressboard contacts the cheese in the cheese holding area;
attaching a lid to the container so that an inner surface of the lid contacts an apex of each leaf spring and causes the pressboard to compress the cheese;
shipping the cheese in the same container used to mold the cheese.

8. The method of claim 7, further comprising:
unpacking the cheese;
removing the leaf springs from the pressboard;
collapsing the container;
shipping a plurality of collapsed containers and leaf springs to a destination, wherein the leaf springs are shipped in a stacked and nested configuration.

9. The method of claim 8, further:
cleaning the plurality of containers and leaf springs;
reusing the plurality of containers and leaf springs without waxing the plurality of containers and leaf springs.

* * * * *